(12) United States Patent
Hwang et al.

(10) Patent No.: US 10,499,317 B2
(45) Date of Patent: Dec. 3, 2019

(54) METHOD FOR TRANSMITTING REFERENCE SIGNAL

(71) Applicant: LG ELECTRONICS INC., Seoul (KR)

(72) Inventors: Daesung Hwang, Seoul (KR); Seungmin Lee, Seoul (KR); Yunjung Yi, Seoul (KR); Joonkui Ahn, Seoul (KR); Hanjun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 530 days.

(21) Appl. No.: 14/895,144

(22) PCT Filed: May 21, 2014

(86) PCT No.: PCT/KR2014/004526
§ 371 (c)(1),
(2) Date: Dec. 1, 2015

(87) PCT Pub. No.: WO2014/204102
PCT Pub. Date: Dec. 24, 2014

(65) Prior Publication Data
US 2016/0119856 A1   Apr. 28, 2016

Related U.S. Application Data

(60) Provisional application No. 61/836,106, filed on Jun. 17, 2013.

(51) Int. Cl.
*H04W 4/00* (2018.01)
*H04W 48/08* (2009.01)
*H04W 48/12* (2009.01)

(52) U.S. Cl.
CPC ........... *H04W 48/08* (2013.01); *H04W 48/12* (2013.01)

(58) Field of Classification Search
CPC ... H04W 76/023; H04W 24/02; H04W 48/16; H04W 8/005; H04W 88/06
See application file for complete search history.

(56) References Cited

U.S. PATENT DOCUMENTS

| 2008/0227453 A1 | 9/2008 | Somasundaram et al. |
| 2009/0270103 A1 | 10/2009 | Pani et al. |

(Continued)

FOREIGN PATENT DOCUMENTS

| CN | 102498685 A | 6/2012 |
| CN | 102577196 A | 7/2012 |

(Continued)

OTHER PUBLICATIONS

LG Electronics, "Analysis and observations on cell association with actual cell loading", RI-132238, 3GPP TSG RAN WG1 Meeting #73, Fukuoka, Japan, May 20-24, 2013; See pp. 1-2.

*Primary Examiner* — Atique Ahmed
(74) *Attorney, Agent, or Firm* — Dentons US LLP

(57) ABSTRACT

In one disclosure of the present specification, a method is provided for transmitting a reference signal in a small-sized cell. The method for transmitting the reference signal may comprise the steps of: generating, by the small-sized cell, a sequence of the reference signal, based on a physical cell ID and cell load degree; transmitting, by the small-sized cell, the generated sequence of the reference signal on a mapped resource element (RE); and transmitting, by the small-sized cell to a terminal during camp-on, information about the cell load degree used during the generation of the sequence of the reference signal.

2 Claims, 16 Drawing Sheets

(56) References Cited

U.S. PATENT DOCUMENTS

| | | | |
|---|---|---|---|
| 2010/0062783 A1* | 3/2010 | Luo | H04J 11/0069 455/450 |
| 2010/0182903 A1* | 7/2010 | Palanki | H04L 1/0041 370/225 |
| 2010/0317343 A1* | 12/2010 | Krishnamurthy | G01S 1/30 455/435.1 |
| 2011/0212730 A1* | 9/2011 | Wennstrom | H04L 1/1861 455/450 |
| 2013/0022035 A1* | 1/2013 | Ling | H04W 72/1247 370/345 |
| 2013/0114523 A1* | 5/2013 | Chatterjee | H04J 11/0053 370/329 |
| 2014/0092785 A1* | 4/2014 | Song | H04L 1/00 370/280 |
| 2014/0133395 A1* | 5/2014 | Nam | H04B 7/0452 370/328 |
| 2014/0269632 A1* | 9/2014 | Blankenship | H04W 76/15 370/329 |
| 2015/0208280 A1* | 7/2015 | Lorca Hernando | H04W 16/08 370/235 |

FOREIGN PATENT DOCUMENTS

| | | |
|---|---|---|
| CN | 102638801 A | 8/2012 |
| CN | 102695177 A | 9/2012 |
| KR | 10-2010-0016463 A | 2/2010 |
| KR | 10-2012-0124337 A | 11/2012 |

\* cited by examiner (b) MULTIPLE CCS (a) SINGLE CC

Antenna 0

(a)

(b)

METHOD FOR TRANSMITTING REFERENCE SIGNAL

This application is a 35 USC § 371 National Stage entry of International Application No. PCT/KR2014/004526 filed on May 21, 2014, which claims priority to US Provisional Application No. 61/836,106, filed on Jun. 17, 2013, all of which are incorporated by reference in their entirety herein.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in a next-generation mobile communication system, it is expected that a small cell of which a cell coverage radius is small is added in coverage of a macro cell and that the small cell handles a more amount of traffic. However, although it is preferable that a user equipment (UE) does not perform association, i.e., selection or reselection, on the small cell with having high cell loading due to such excessive traffic, there is no conventional method in which the UE can distinguish the small cell having the high cell loading from other small cells.

SUMMARY OF THE INVENTION

Accordingly, the disclosure of the specification has been made in an effort to solve the problem.

In order to achieve the aforementioned purpose, according to one disclosure of the present specification provides a method of transmitting a reference signal in a small cell. The method may comprise: generating, by the small cell, a sequence of the reference signal on the basis of a physical cell identity (ID) and a cell loading level; transmitting, by the small cell, the generated sequence of the reference signal on a mapped resource element (RE); and transmitting, by the small cell to a terminal camping on the cell, information regarding the cell loading level used during the generation of the sequence of the reference signal.

The generating of the sequence of the reference signal may comprise inputting the physical cell ID and information based on the cell loading level to a pseudo-random sequence.

The generating of the sequence of the reference signal may comprise: generating a first sequence on the basis of the physical cell ID; generating a second sequence on the basis of the information based on the cell loading level; and generating the sequence of the reference signal by adding the first sequence and the second sequence.

The greater the cell loading level, the greater the second sequence to be added to the sequence of the reference signal. The smaller the cell loading level, the smaller the second sequence to be added to the sequence of the reference signal.

The information related to the cell loading level to be delivered to the terminal may comprise information regarding the second sequence.

The information regarding the second sequence may comprise a seed value that can be utilized in the generation of the second sequence.

In order to achieve the aforementioned purpose, according to one disclosure of the present specification provides a base station of a small cell for transmitting a reference signal. The base station may comprise: a processor for generating a sequence of the reference signal on the basis of a physical cell identity (ID) and a cell loading level; and a transceiver for transmitting the generated sequence of the reference signal on a mapped resource element (RE), and for transmitting, to a terminal camping on the cell, information regarding the cell loading level used during the generation of the sequence of the reference signal.

According to a disclosure of the present specification, the aforementioned problem of the conventional technique is solved. More specifically, according to the disclosure of the present specification, when selecting any one of a plurality of intra-frequency cells, a user equipment (UE) can select suitable one according to cell loading.

DESCRIPTION OF EXEMPLARY EMBODIMENTS

Figure 1:
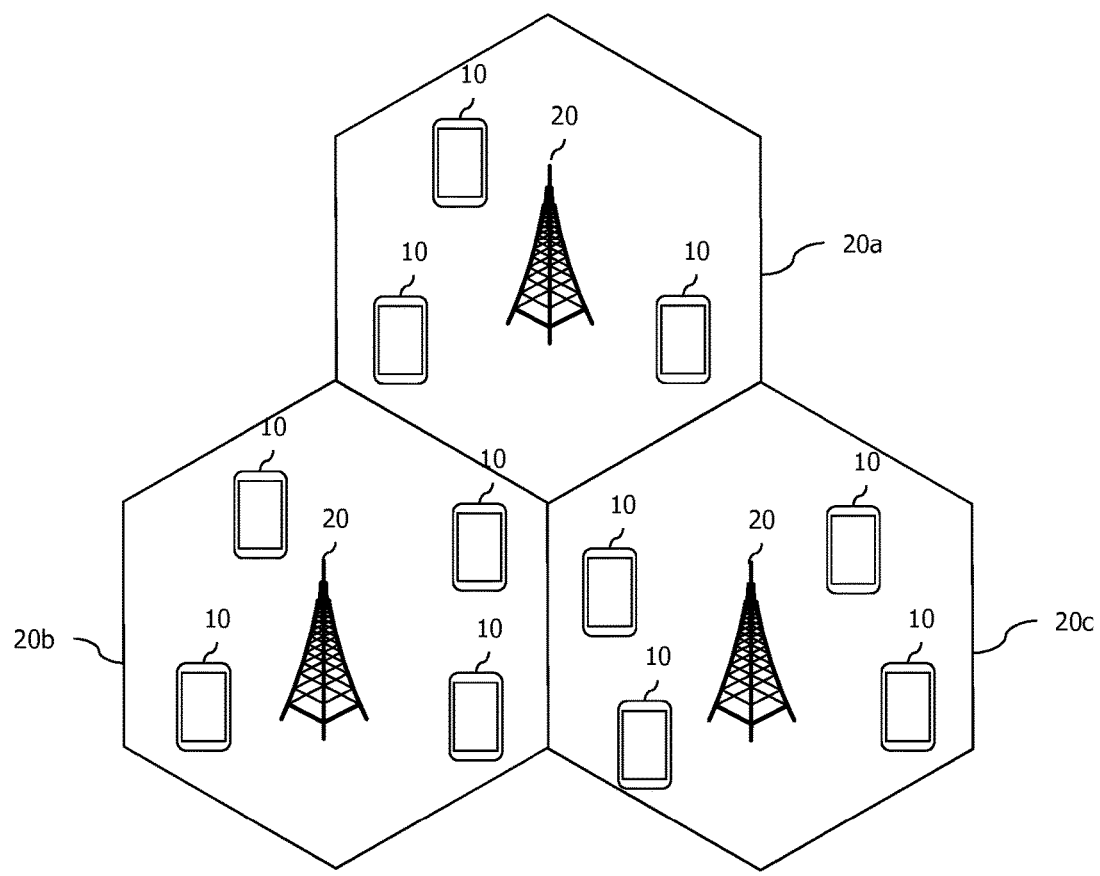
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
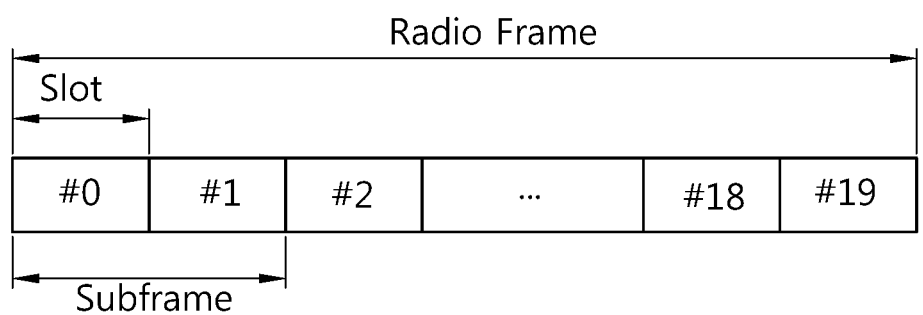
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
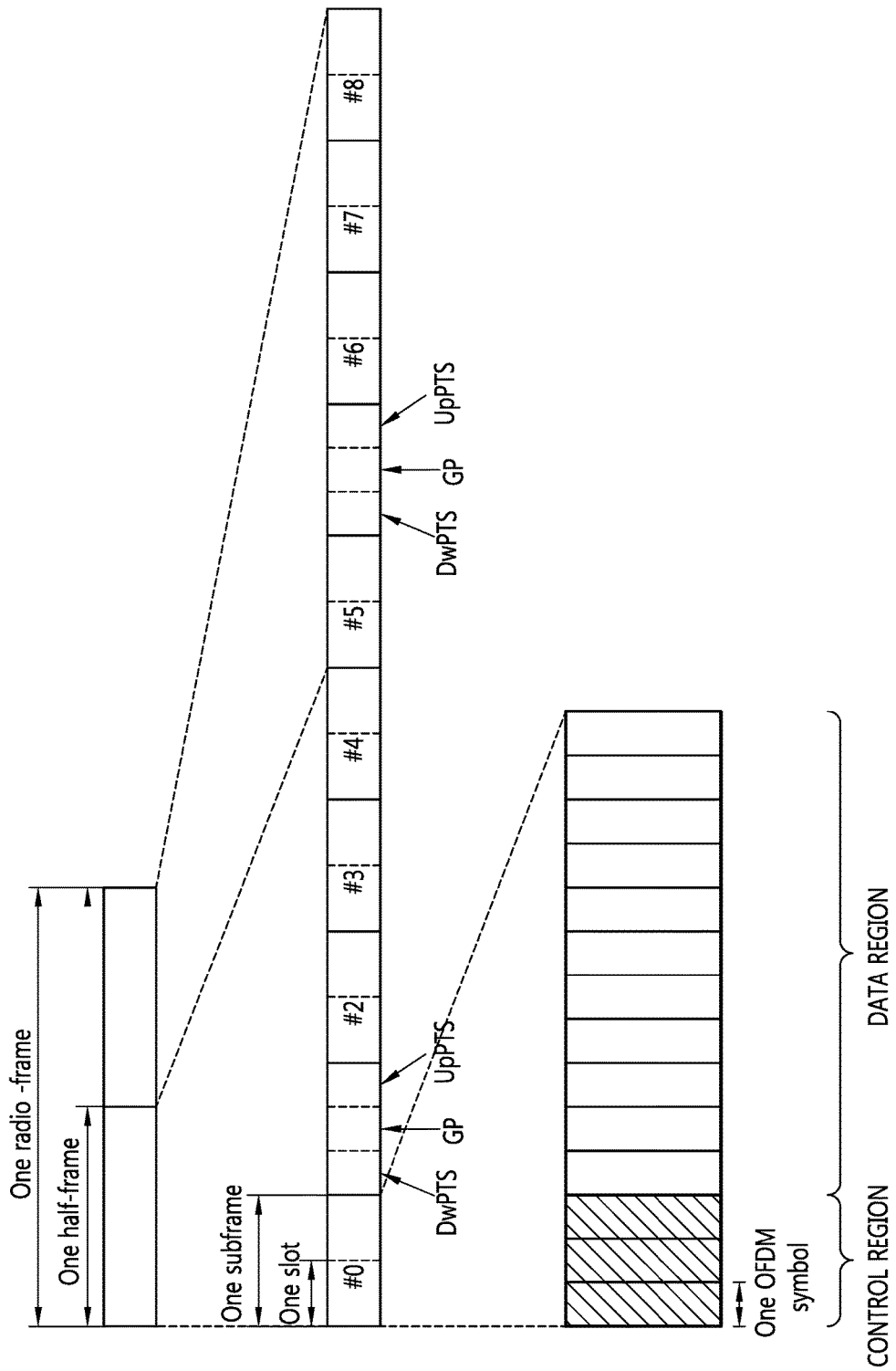
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, V' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
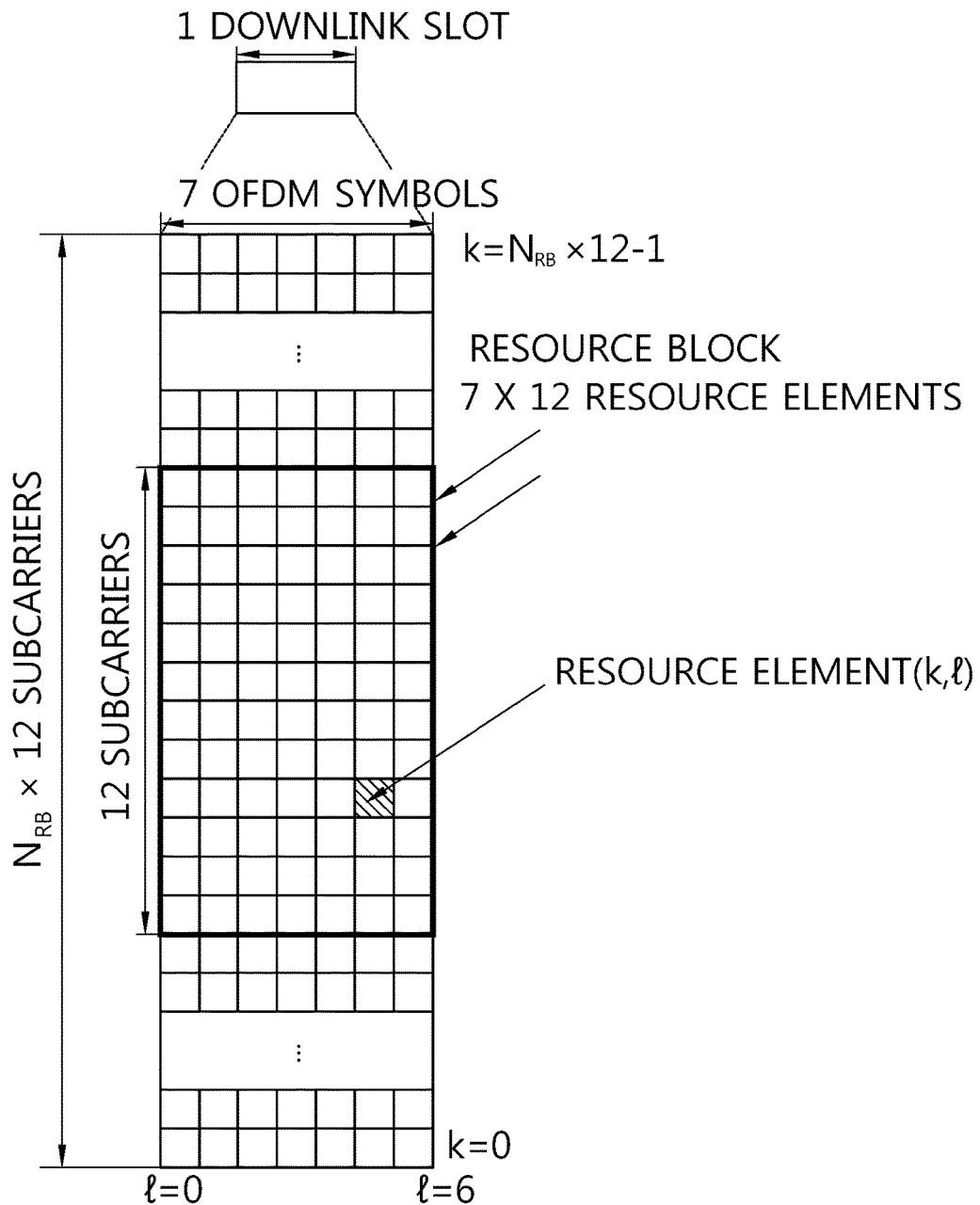
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$ is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
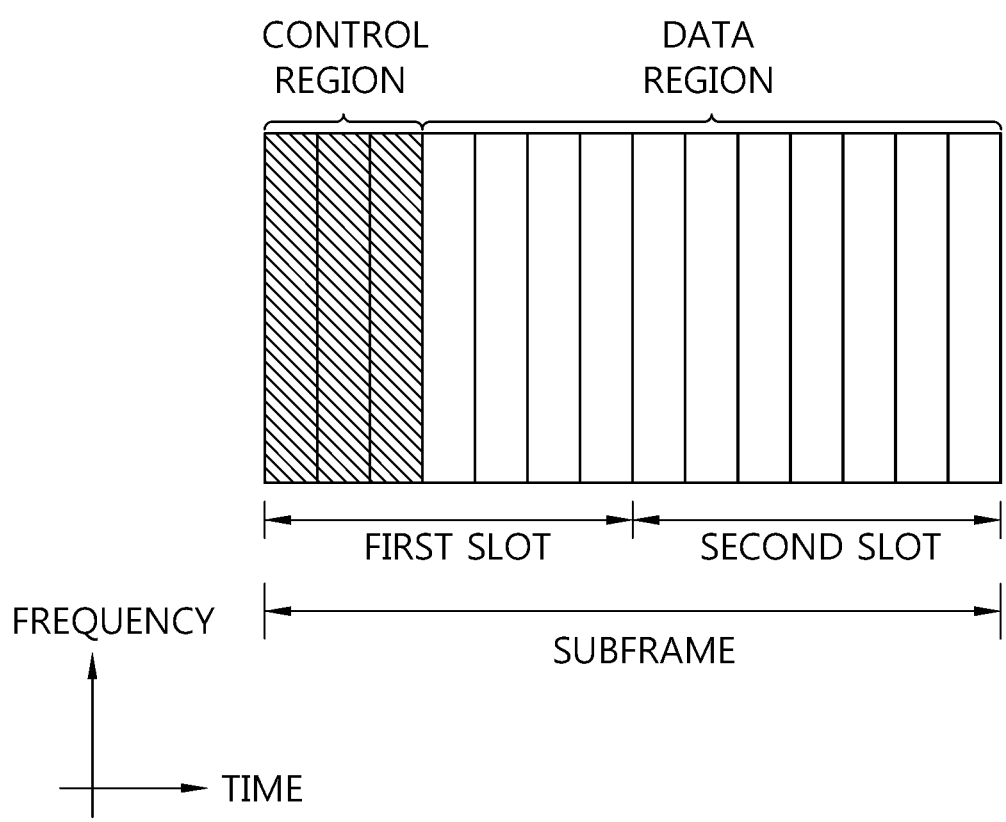
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
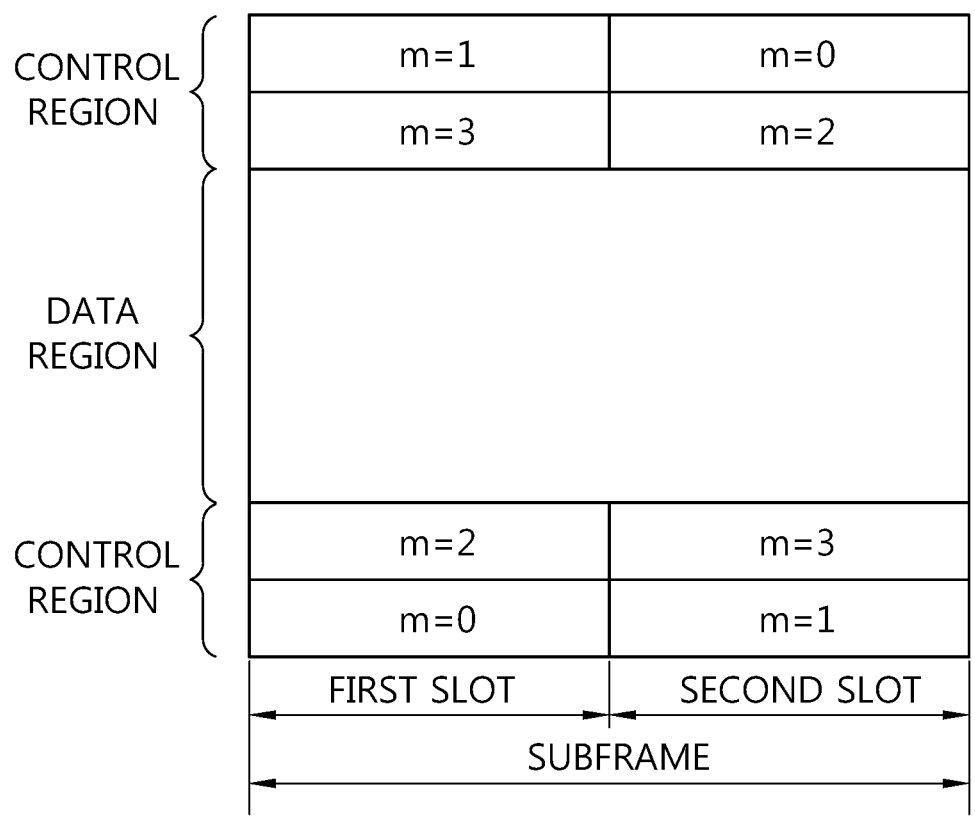
FIG. 6 illustrates the architecture of an uplink subframe in 3GPP LTE.
Figure 6:
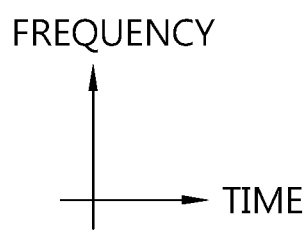

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
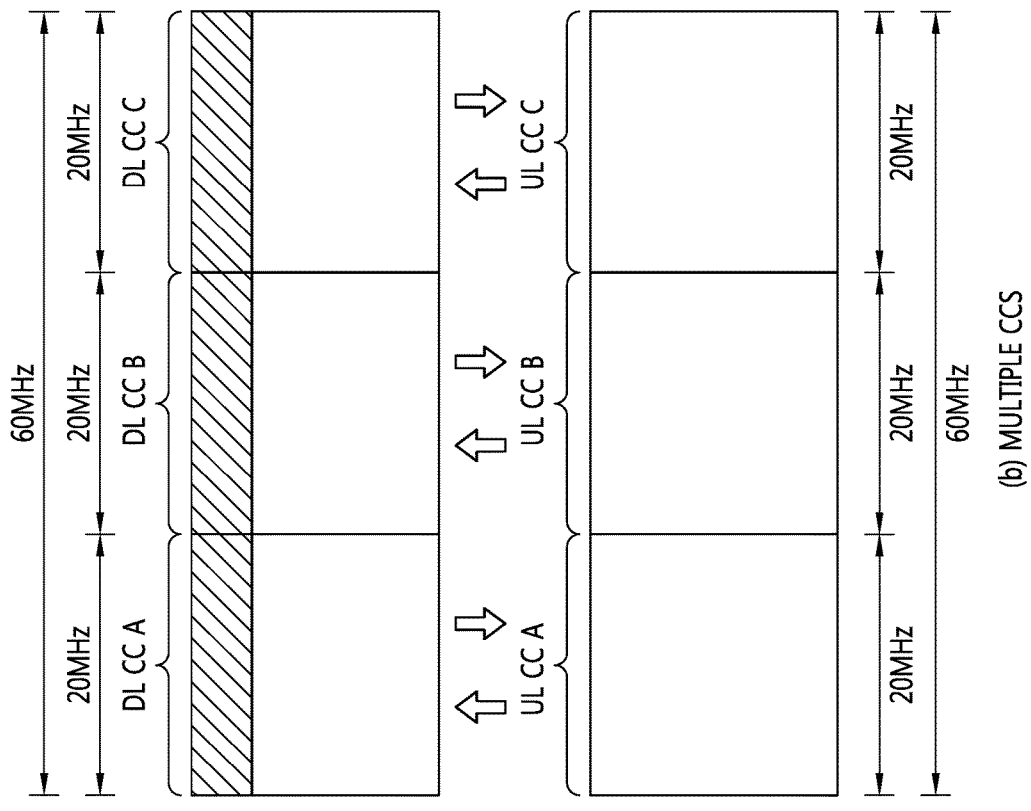
FIG. 7 illustrates an example of comparison between a single carrier system and a carrier aggregation system.
Figure 7:
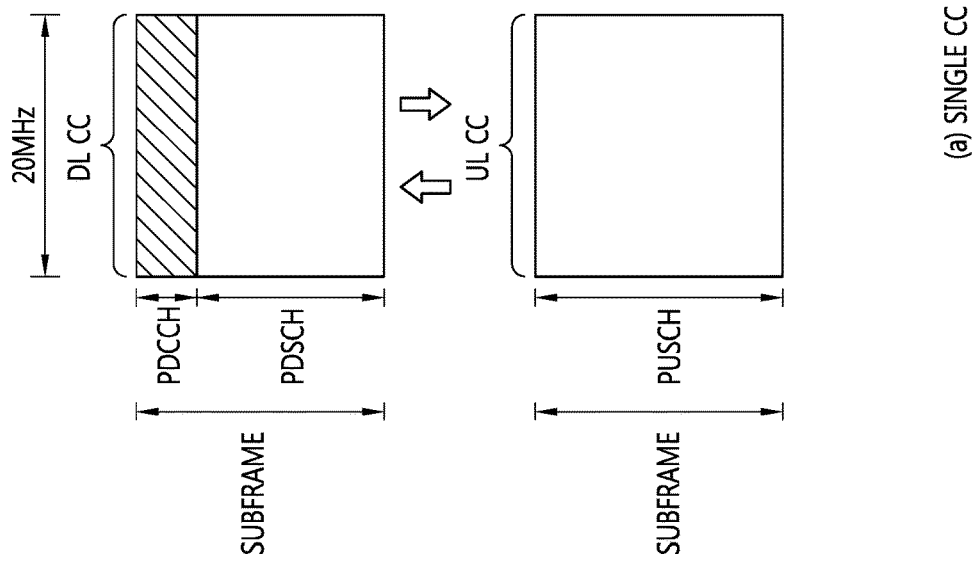

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
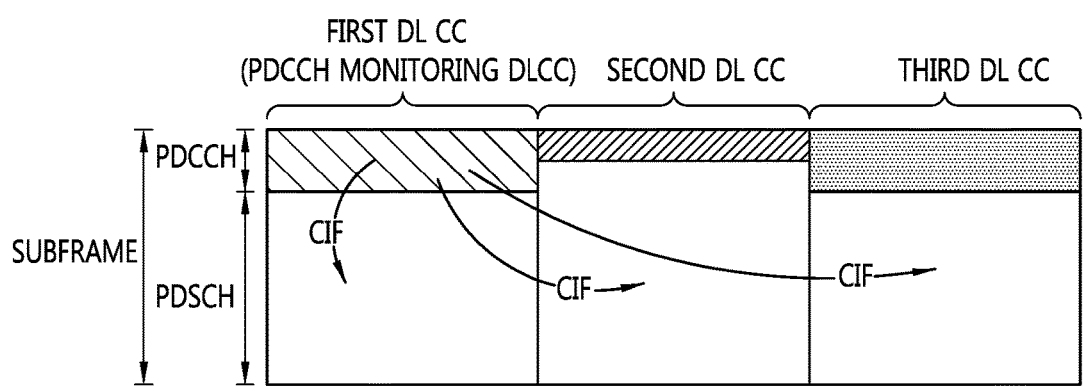
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, various reference signals (RSs) are transmitted in a subframe.

In general, an RS is transmitted as a sequence. Any sequence may be used as an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific RS (CRS), a multimedia broadcast and multicast single frequency network (MBSFN) RS, a UE-specific RS (URS), a positioning RS (PRS), and a channel state information (CSI) RS (CSI-RS). The CRS is an RS transmitted to all UEs in a cell. The CRS may be used in channel measurement for a CQI feedback and in channel estimation for a PDSCH. The MBSFN RS may be transmitted in a subframe allocated for MBSFN transmission. The URS is an RS received by a specific UE or a specific UE group in the cell, and may also be called a demodulation RS (DM-RS). The DM-RS is primarily used in data demodulation of a specific UE or a specific UE group. The PRS may be used for location estimation of the UE. The CSI-RS is used in channel estimation for a PDSCH of an LTE-A UE. The CRI-RS is relatively sparsely arranged in a frequency domain or a time domain. The CSI-RS may be punctured in a data region of a normal subframe or an MBSFN subframe.

Figure 9:
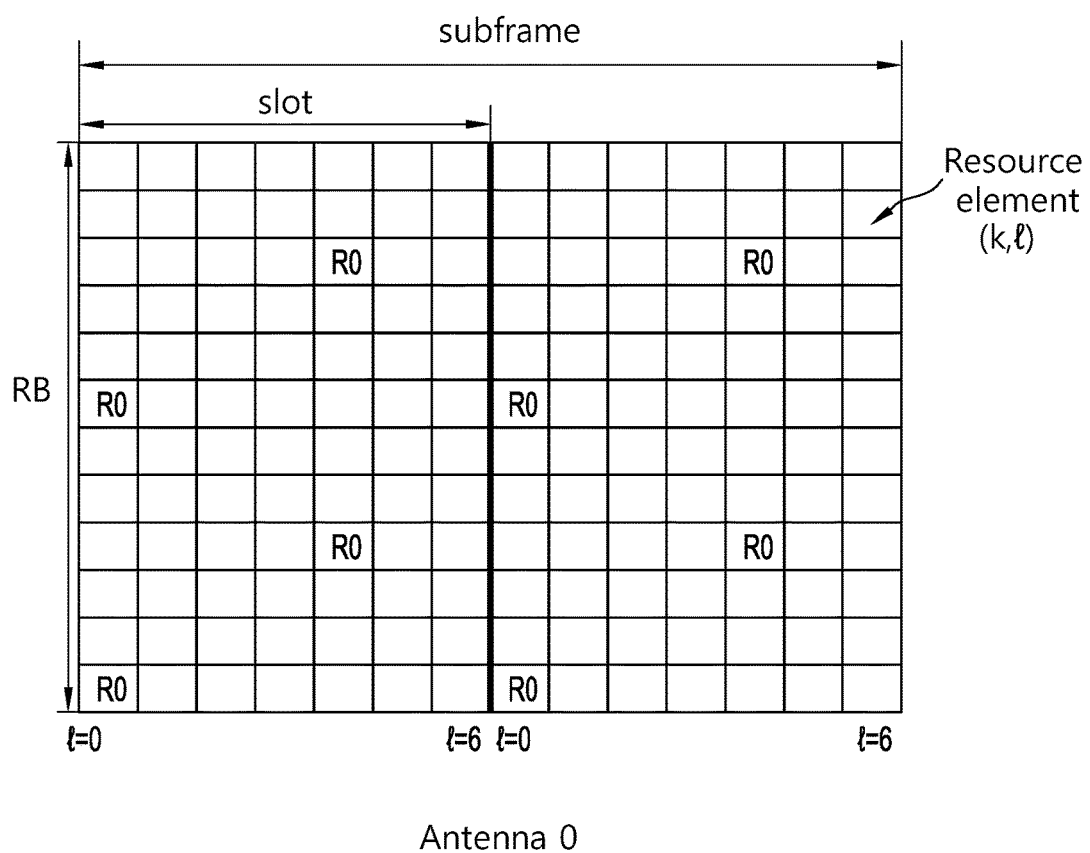
FIG. 9 shows an example of a pattern in which a cell-specific reference signal (CRS) is mapped to a resource block (RB) when a base station uses one antenna port.

FIG. 9 shows an example of a pattern in which a CRS is mapped to an RB when a BS uses one antenna port.

Referring to FIG. 9, RO denotes an RE to which a CRS transmitted using an antenna port number 0 of a BS is mapped.

An RS sequence $r_{l,n_s}(m)$ for a CRS is defined as follows.

$$r_{l,n_s}(m) = \frac{1}{\sqrt{2}}(1 - 2 \cdot c(2m)) + j\frac{1}{\sqrt{2}}(1 - 2 \cdot c(2m+1)).$$ [Equation 1]

Herein, m=0, 1, . . . , $2N_{maxRB}-1$. $N_{maxRB}$ is the maximum number of RBs. ns is a slot number in a radio frame. t is an OFDM symbol index in a slot.

A pseudo-random sequence c(i) is defined by a length-31 Gold sequence as follows, and an output c(n) is defined as follows.

$c(n)=(x_1(n+N_c)+x_2(n+N_c))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 2]

Herein, Nc=1600, and a first m-sequence is initialized by using x1(0)=1, x1(n)=0, m=1, 2, . . . , 30. A second m-sequence is initialized with $c_{init}=2^{10}(7(ns+1)+/+1)(2N^{cell}_{ID}+1)+2N^{cell}_{ID}+N_{CP}$ at a start of each OFDM symbol. $N^{cell}_{ID}$ is a physical cell identifier (PCI) of a cell. $N_{CP}$ is 1 in a normal CP case, and is 0 in an extended CP case.

The CRS is transmitted in all downlink subframes in a cell which supports PDSCH transmission. The CRS may be transmitted on antenna ports 0 to 3. The CRS may be defined only for Δf=15 kHz.

A pseudo-random sequence $r_{l,n_s}(m)$ generated from a seed value based on a cell identity (ID) is subjected to resource mapping to a complex-valued modulation symbol $a^{(p)}_{k,l}$ as shown in Equation 3 below.

$$a_{k,l}^{(p)} = r_{l,n_s}(m')$$ [Equation 3]

Herein, $n_s$ denotes a slot number in one radio frame, p denotes an antenna port, and l denotes an OFDM symbol number in a slot. k denotes a subcarrier index. l and k are expressed by the following equation.

$$k = 6m + (v + v_{shift})\bmod 6$$ [Equation 4]

$$l = \begin{cases} 0, N^{DL}_{symb}-3 & \text{if } p \in \{0,1\} \\ 1 & \text{if } p \in \{2,3\} \end{cases}$$

$$m = 0, 1, \ldots, 2 \cdot N^{DL}_{RB} - 1$$

$$m' = m + N^{max,DL}_{RB} - N^{DL}_{RB}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$ [Equation 5]

In the above equation, p denotes an antenna port, and $n_s$ denotes a slot number 0 or 1.

k has 6 shifted indices according to a cell ID ($N^{Cell}_{ID}$). Accordingly, cells having cell IDs 0, 6, 12, etc., which are a multiple of 6, transmit a CRS in the same subframe position k.

In the above equation, l is determined according to the antenna port p, and a possible value for l is 0, 4, 7, 11. Accordingly, the CRS is transmitted on symbols 0, 4, 7, and 11.

A resource element (RE) allocated to a CRS of one antenna port cannot be used in transmission of another antenna port, and must be set to 0 (zero). Further, in a multicast-broadcast single frequency network (MBSFN) subframe, the CRS is transmitted only in a non-MBSFN region.

Figure 10A:
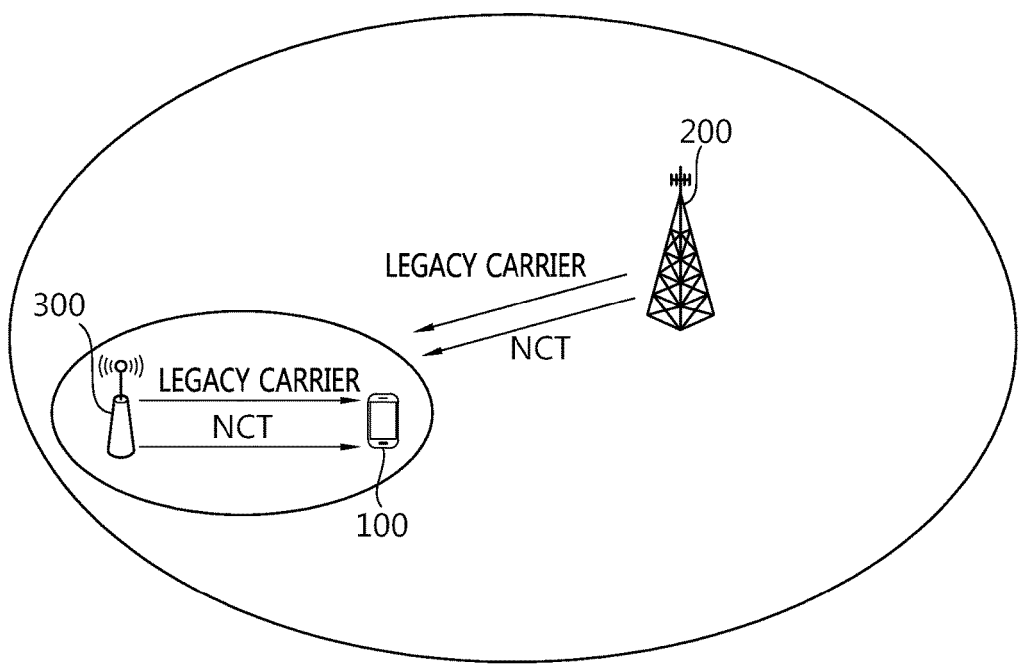
FIG. 10a shows an example of a new carrier for a next-generation wireless communication system.

FIG. 10a shows an example of a new carrier for a next-generation wireless communication system.

The conventional 3GPP LTE/LTE-A-based wireless communication system transmits a reference signal, a synchronization signal, a control channel, etc, through a downlink carrier. As such, a downlink carrier based on 3GPP LTE/LTE-A is called a legacy carrier. However, a new carrier can be introduced in a next-generation wireless communication system after LTE/LTE-A to mitigate interference between a plurality of serving cells and to improve extensibility of a carrier. This is called an extension carrier or a new carrier type (NCT). A cell based on the extension carrier is called an extension cell.

The NCT may be used by a legacy macro cell 200. In addition, the NCT may be located within coverage of the legacy macro cell 200, and may be used by one or more small cells 300 (or also referred to as a pico cell, a femto cell, or a micro cell) having low transmission power.

Although the NCT may be used as a primary cell (i.e., PCell), it is considered that the NCT is mainly used only as a secondary cell (i.e., SCell) together with a legacy-type primary cell (i.e., PCell). If a legacy-type subframe is used in the primary cell (i.e., PCell) and an NCT subframe is used in the secondary cell (i.e., SCell), a configuration for the subframe may be signaled through the secondary cell (i.e., SCell). The secondary cell (i.e., SCell) in which the NCT subframe is used may be activated by the primary cell (i.e., PCell).

When the NCT is used only as the secondary cell as described above, legacy UEs are not considered. Therefore, the legacy UEs do not have to perform cell detection, cell selection, and cell reselection on the secondary cell in which the NCT is used. Alternatively, since the NCT used as only the secondary cell cannot be recognized by the legacy UEs, unnecessary elements can be decreased in comparison with the legacy secondary cell. Therefore, a more effective operation is possible.

Further, in the NCT, transmission of a CRS which is transmitted with a fixed high density is omitted or significantly reduced. In the legacy carrier, the CRS is transmitted in all downlink subframes across a full system band, whereas in the NCT, the CRS may not be transmitted or may be transmitted in a specific downlink subframe throughout a part of the system band. Accordingly, in the NCT, the CRS may not be used in demodulation and may be used only in synchronization tracking. In this sense, the CRS may also be called a tracking RS (TRS) or an enhanced synchronization signal (eSS) or a reduced CRS (RCRS).

The TRS may be transmitted through one RS port. The TRS may be transmitted through the full frequency band or the part of the frequency band.

In the legacy carrier, a PDCCH is demodulated based on the CRS, whereas in the NCT, the PDCCH may not be transmitted. In the NCT, only a DMRS (or URS) is used in data demodulation.

Accordingly, a UE receives downlink data on the basis of the DMRS (or URS), and measures a channel state on the basis of a CRI-RS transmitted relatively less frequently.

When using the NCT, an overhead caused by a reference signal is minimized, and thus reception performance is boosted and a radio resource can be effectively used.

Figure 10B:
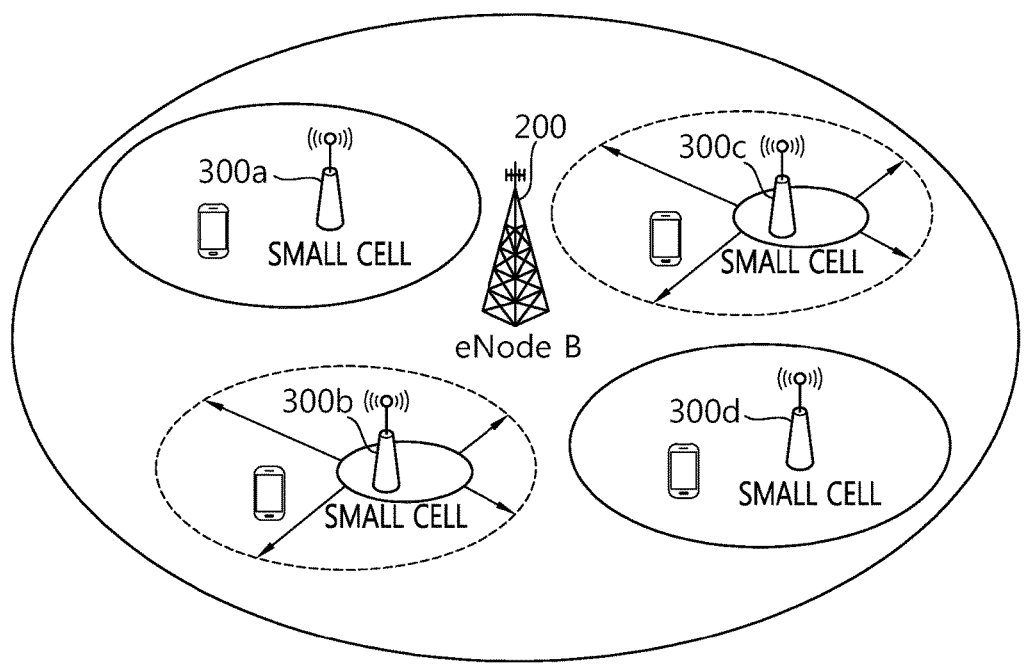
FIG. 10b shows a heterogeneous network environment in which a macro cell and a small cell co-exist and which is possibly used in a next-generation wireless communication system.

FIG. 10b shows a heterogeneous network environment in which a macro cell and a small cell co-exist and which is possibly used in a next-generation wireless communication system.

Referring to FIG. 10b, it is shown a heterogeneous network environment in which a macro cell 200 overlaps with one or more small cells 300a, 300b, 300c, and 300d. A service of the macro cell 200 is provided by a macro eNodeB (MeNB). In the present specification, the macro cell and the MeNB may be used together. A UE having access to the macro cell 200 may be referred to as a macro UE. The macro UE receives a downlink signal from the MeNB, and transmits an uplink signal to the MeNB.

In such a heterogeneous network, coverage holes of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

Meanwhile, the small cell may use a frequency band currently assigned to LTE/LTE-A, or may use a higher frequency band (e.g., a band greater than or equal to 3.5 GHz).

On the other hand, in a next LTE-A system, it is considered that the small cell is used only as a macro-assisted small cell which cannot be used independently and can be used under an assistance of the macro cell.

The small cells 300a, 300b, 300c, and 300d may have similar channel environments, and are located close to each other. Therefore, interference between the small cells is not a big problem.

The small cells 300b and 300c may extend or reduce their coverage to decrease an interference influence. Such coverage extension and reduction are called cell breathing. For example, as illustrated, the small cells 300b and 300c may be on or off according to a situation.

On the other hand, the small cell may use a frequency band currently assigned to LTE/LTE-A, or may use a higher frequency band (e.g., a band greater than or equal to 3.5 GHz).

Meanwhile, the UE may perform dual connectivity to the macro cell and the small cell. Possible dual connectivity scenarios are shown in FIG. 11a to FIG. 11d.

Figure 11A:
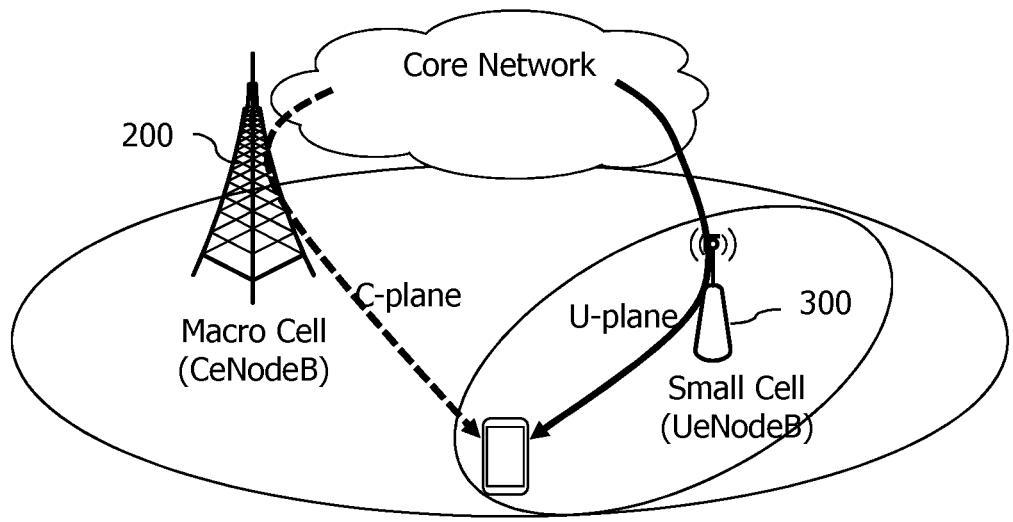
FIG. 11a and FIG. 11b show possible dual connectivity scenarios for a macro cell and a small cell.
Figure 11B:
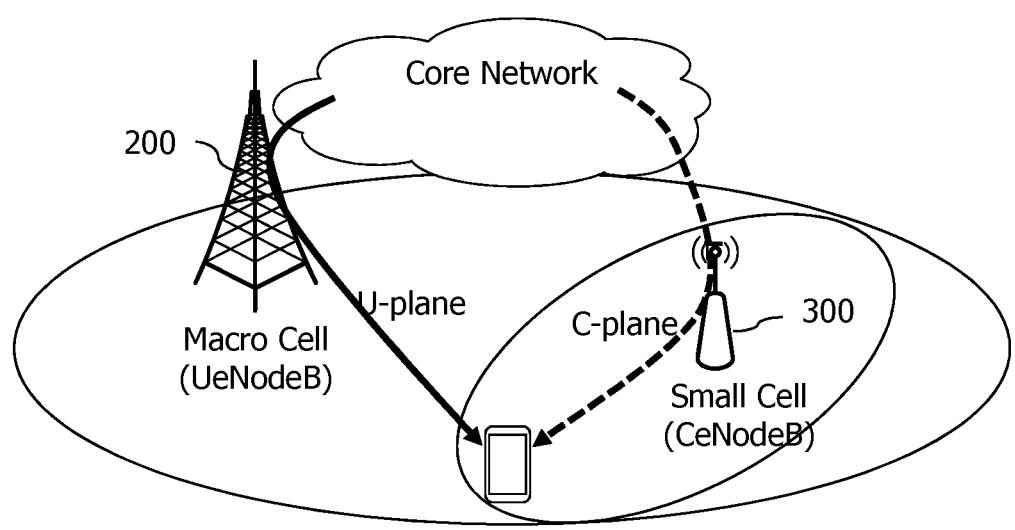

FIG. 11a and FIG. 11b show possible dual connectivity scenarios for a macro cell and a small cell.

As shown in FIG. 11a, a macro cell and a small cell may be assigned to a UE as a Control-plane (hereinafter, C-plane) and a User-plane (hereafter, U-plane), respectively.

Alternatively, as shown in FIG. 11b, a small cell and a macro cell may be assigned to a UE as a C-plane and a U-plane, respectively. In the present specification, for convenience, a cell of the C-plane and a cell of the U-plane are referred to as a C-cell and a U-cell, respectively.

The C-plane supports an RRC connection configuration and reconfiguration, an RRC idle mode, a mobility including handover, a cell selection/reselection, an HARQ process, a carrier aggregation (CA) configuration and reconfiguration, a necessary procedure for RRC configuration, a random access procedure, or the like. In addition, the U-plane supports data processing of an application, a CSI report, an HARQ process for application data, a multicasting/broadcasting service, or the like.

From a UE perspective, the C-plane and the U-plane are configured as follows. The C-cell may be configured as a primary cell, and the U-cell may be configured as a secondary cell. Alternatively, on the contrary, the U-cell may be configured as the primary cell, and the C-cell may be configured as the secondary cell. Alternatively, the C-cell may be separately handled in a special manner, and the U-cell may be configured as the primary cell. Alternatively, both of the C-plane and the U-cell may be configured as the primary cells. However, in the present specification, for convenience, it is assumed in the following description that the C-cell is configured as the primary cell and the U-cell is configured as the secondary cell.

Figure 12:
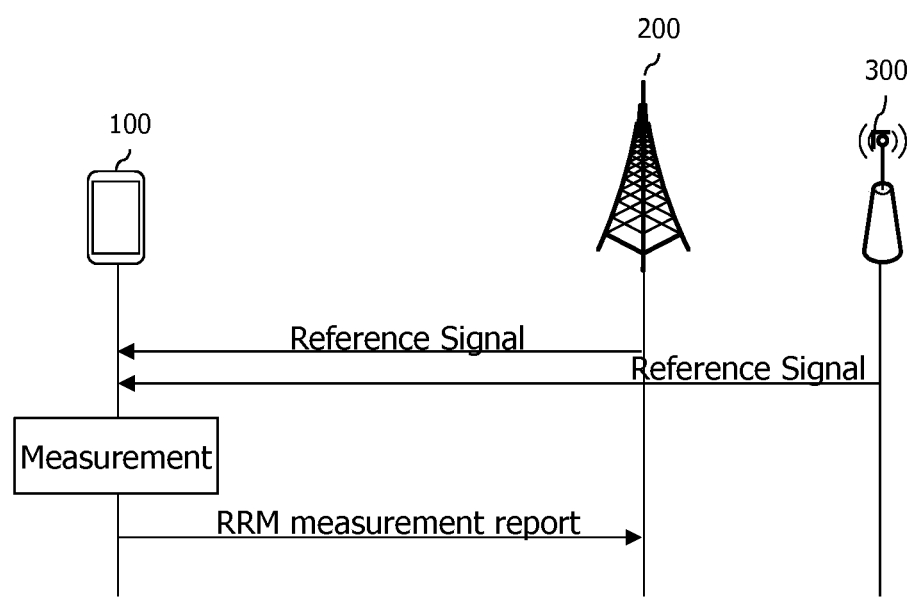
FIG. 12 shows measurement and measurement reporting procedures.

FIG. 12 shows measurement and measurement reporting procedures.

It is necessary for a mobile communication system to support a mobility of a UE 100. Therefore, as shown in FIG. 12, the UE 100 persistently measures quality for a serving cell which currently provides a service and quality for a neighbor cell. The UE 100 reports a measurement result to a network at a proper time, and the network provides an optimal mobility to the UE through a handover or the like. A measurement performed for such a purpose is ordinarily called a radio resource management (RRM).

Meanwhile, the UE 100 monitors downlink quality of a primary cell (Pcell) on the basis of a CRS. This is called radio link monitoring (RLM). For the RLM, the UE 100 estimates the downlink quality, and compares the estimated downlink quality with a threshold.

In this case, the UE 100 may perform the measurement by using three methods described below.

1) Reference signal received power (RSRP): It indicates average reception power of all REs which carry a CRS transmitted through a full band. In this case, average reception power of all REs which carry a CSI RS may be measured instead of the CRS.

2) Received signal strength indicator (RSSI): It indicates reception power measured in a full band. The RSSI includes all of a signal, interference, and a thermal noise.

3) Reference symbol received quality (RSRQ): It indicates a CQI, and may be determined as RSRP/RSSI depending on a measurement bandwidth or subband. That is, the RSRQ implies a signal-to-noise interference ratio (SINR). Since the RSRP cannot provide sufficient mobility information, the RSRQ may be used in a handover and a cell reselection instead of the RSRP.

It may be calculated as RSRQ=RSSI/RSSP. Alternatively, it may be calculated as RSRQ=N×RSSI/RSSP. Herein, N may be a variable (e.g., the number of PRBs) or function related to a bandwidth for measuring RSSI.

It is shown in FIG. 12 that a serving cell of the UE 100 is a macro cell 200, and a neighbor cell thereof is a small cell 300. Therefore, if each of the macro 200, i.e., the serving cell, and the small cell 300, i.e., the neighbor cell, transmits a cell-specific reference signal (CRS), the UE 100 performs a measurement through the CRS, and transmits an RRC measurement report message including a measurement result thereof to the macro cell 200, i.e., the serving cell.

However, if the macro cell 200 operates at a frequency band (e.g., 2 GHz) assigned to LTE/LTE-A, and the small cell 300 operates at a higher frequency band (e.g., a band greater than or equal to 3.5 GHz), there is a need to perform an inter-frequency measurement.

In this case, in a next-generation system, each UE may perform cell association, for example, cell selection and reselection, on intra-frequency cells on the basis of RSRP and on inter-frequency cells on the basis of RSRQ.

As described above, it is calculated as RSRQ=RSSI/RSSP or RSRQ=N×RSSI/RSSP. The RSSI may change depending on cell loading at a corresponding frequency or band, for example, a presence/absence of traffic or a traffic amount. For example, if the macro cell has a great amount of traffic, RSSI of the macro cell may be higher than that of the small cell. Therefore, it can be considered that cell loading is also considered when selecting one of inter-frequency cells or cell groups.

However, when selecting or reselecting any one of two intra-frequency cells, it is achieved on the basis of RSRP, and thus there is a disadvantage in that a cell loading level is not considered.

In addition, the cell loading level is not considered not only in case of cell selection or reselection but also in case of selecting a secondary cell to be added for dual connectivity or carrier aggregation (CA). Herein, in order to add the secondary cell, the UE may transmit information (e.g., RRM measurement result) of neighbor cells to a serving cell, and the serving cell may finally select the secondary cell.

Hereinafter, disclosures of the present specification for solving the aforementioned problems will be described.

<Method According to Disclosures of the Present Specification>

According to disclosures of the present specification, there are provided methods in which cell loading information can be considered when a UE selects one or more of a plurality of intra-frequency cells. The methods according to the disclosures of the present specification will be described specifically for a case where the UE acquires the cell loading information and a case where the UE does not have to know the cell loading information (a method of determining a reference for an RRM according to cell loading).

The term 'cell loading information (hereinafter, a traffic amount)' used in the present specification may be expressed by the number of resource blocks (RBs) which are in use in all RBs corresponding to a specific cell, and may be expressed as RBs which are in use on average for each subframe during a plurality of subframes (hereinafter, a traffic measurement duration). The RB in use may be defined as an RB including SCH, PBCH, (E-)PDCCH, PDSCH, etc, or may be defined as an RB including a UE-specific channel (e.g., USS (UE-specific Search Space) PDCCH and PDSCH, DMRS, or the like corresponding thereto). In addition, the cell loading information may be a past or current value measured during the measurement duration, or may be a prediction value estimated by using a method of interpolation, extrapolation, etc.

1. Method of Additionally Utilizing Cell Loading Information by UE According to First Disclosure of the Present Specification In a next-generation system, each UE may acquire cell loading information (e.g., traffic amount information) of a neighbor cell through a higher layer signal from a serving cell, or may acquire the cell loading information of the neighbor cell from a discovery signal of the neighbor cell. This will be described below in detail with reference to FIG. 13.

Figure 13:
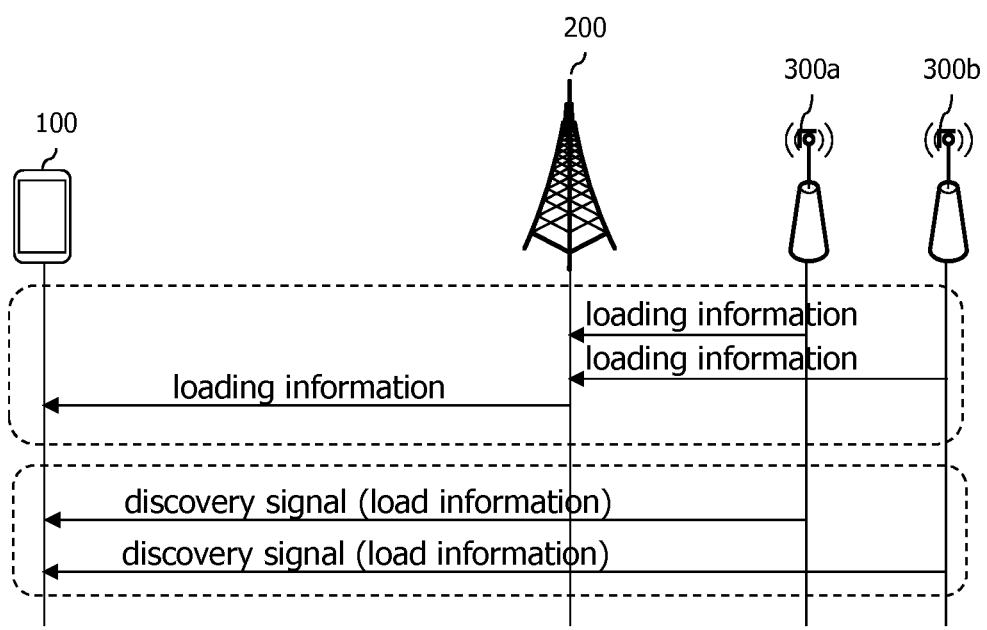
FIG. 13 is an exemplary flowchart showing a method according to a first disclosure of the present specification.

FIG. 13 is an exemplary flowchart showing a method according to a first disclosure of the present specification.

As can be seen from FIG. 13, a macro cell 200 and a small cell 300 are shown for example.

In this case, if a serving cell of a UE 100 is the macro cell 200, loading information of the small cell 300 which is a neighbor cell may be acquired from a higher layer signal of the macro cell 200.

Alternatively, the UE 100 may acquire loading information from a discovery signal of the small cell 300 which is the neighbor cell. This may be useful when the serving cell of the UE 100 is not determined yet. The UE 100 may extract the loading information included in the discovery signal. Alternatively, if a transmission pattern of the discovery signal may vary depending on the loading information, the UE 100 may indirectly extract the loading information according to the pattern of the received discovery signal.

The UE 100 may select a cell having a small load among a plurality of intra-frequency cells through the acquired cell loading information, thereby acquiring a load balancing effect.

Next, specific methods for cell association utilizing the cell loading information acquired by the UE 100 are described in detail.

In a first method, the UE 100 may first consider cell loading information before comparing RSRP for a reference signal (e.g., CRS) for an RRM between cells. The cell loading information may be divided into several levels according to a traffic amount in advance or through a higher layer signal. The UE 100 is allowed to perform cell association through RSRP comparison only for cells corresponding to a case where the traffic amount is less than or equal to a specific upper threshold (i.e., a threshold predetermined or determined through the higher layer signal). Alternatively, the UE 100 may transmit an RRM measurement result (e.g., RSRP) for the corresponding cell to a serving cell, and the serving cell may select a cell for dual-connectivity or carrier aggregation (CA) and report it to the UE. The traffic amount may be expressed as the number of subframes (including reserved subframes) and RBs in use in the corresponding cell during a specific measurement duration or as a percentage thereof (against the total RBs). Instead of the upper threshold, a lower threshold (a number predetermined or determined through a higher layer signal) defined based on a lowest ratio of resources in use may be used. The thresholds may be predetermined or may be determined through the higher layer signal.

In a second method, the UE 100 compares RSRP values for a reference signal (e.g., CRS) for an RRM between cells, and determines cells of which an RSRP value exceeds a specific threshold (predetermined or determined through the higher layer signal). Next, the UE 100 may compare cell loading information for the determined cells to perform cell association. The cell loading information may include the number of subframes (including reserved subframes) and RBs in use in a corresponding cell during a specific measurement duration or a percentage thereof (against the total RBs). A cell having a lowest resource usage rate may be selected as a final cell among the determined cells, and a margin value that can be determined through the higher layer signal may be introduced so that some of cells having the low resource usage rate are selected as the final cell.

In a third method, when the UE 100 performs cell association based on cell loading, RSRP for a reference signal (RS) for an RRM and cell loading information (e.g., a resource usage rate) may be considered simultaneously. An example of simultaneous consideration is described as follows. First, the UE 100 performs operations of: a) calculating a temporary SINR on the basis of RSRP, RSRQ, RSSI, and scheduling information of a corresponding cell; b) calculating a metric by using a resource usage rate or an amount of resources (e.g., the average number of RBs, a bandwidth (BW) size) that can be used in the corresponding cell; and c) performing cell selection on the basis of the calculated metric. For example, a temporary SINR for a cell i may be expressed by Equation 6 below.

$$SINR_{temp,i} = \frac{N \times RSRP_i \times M_{sc}}{RSSI - RSRP_i \times M_{used,i}}$$ [Equation 6]

N is the number of RBs corresponding to an RSSI measurement BW. $M\_\{sc\}$ is the number of subcarriers for each RB, and may be 12 for example. $M\_\{used,i\}$ is a sum of the number of RRM reference signals (RSs) used in the cell i and the number of RBs used in data as to a full BW. If a ratio between transmit (Tx) power of the RRM RS and Tx power of the data is not 0 dB, Equation 6 above may be readjusted according to a corresponding power ratio. A metric for the cell i is for considering capacity, and may be expressed by Equation 7 below.

$$metric_i = B_i \log_2(1+SINR_{temp,i})$$ [Equation 7]

B_i may be an average value of RBs not used in a corresponding cell (herein, whether to perform scheduling and reservation is considered), and may be a BW calculated from the average value. Alternatively, B_i may consider a reciprocal number of a resource usage rate or a subtraction of the resource usage rate from a constant value. In a process of selecting a cell for dual-connectivity or carrier aggregation (CA), it may be considered that the UE transmits an RRM measurement result (e.g., RSRP, RSRQ, RSSI) for all or some cells to a serving cell on the basis of the metric.

Although the first to third methods are described above under the assumption that a reference signal for the RRM is a CRS, the reference signal may be a CSI-RS. For example, when a plurality of cluster-based or intra-frequency cells use the same physical cell ID, RSRP for the CSI-RS, not the CRS, may be used.

2. Method of Configuring RRM Reference Based on Cell Loading Information According to Second Disclosure of the Present Specification According to a second disclosure of the present specification, even if a UE 100 cannot directly acquire cell loading information, cell loading may be considered when performing determination for cell association. Specifically, even if the UE 100 cannot directly acquire the cell loading information, in order for the UE 100 to consider the cell loading information when performing determination on the cell association, each cell may configure transmission of an RS so that an RRM measurement (e.g., RSRP, RSRQ, RSSI, etc.) result is dependent on the cell loading (or traffic information). More detailed methods are described with reference to the accompanying drawings.

Figure 14A:
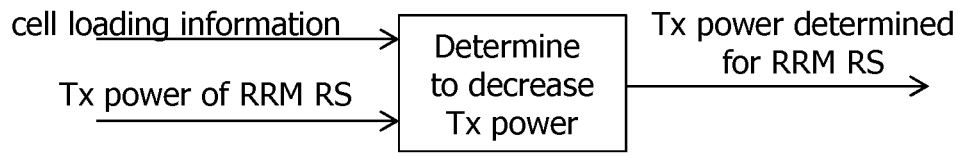
FIG. 14a shows an example of a method in which transmit (Tx) power of a reference signal is adjusted depending on cell loading information according to a first method of a second disclosure of the present specification.

FIG. 14a shows an example of a method in which Tx power of a reference signal is adjusted depending on cell loading information according to a first method of a second disclosure of the present specification.

As can be seen from FIG. 14A, a cell of a BS may consider cell loading (or a traffic amount) when determining Tx power of a reference signal (RS) for RRM. The cell may be a small cell, or may be a cell determined through a higher layer signal.

Specifically, Tx power corresponding to the RS may be determined to be decreased when traffic of a corresponding cell is increased. Therefore, the greater the load, the lower the Tx power of the RS. As a result, since RSRP for the RS is also decreased, a possibility that the UE 100 selects the cell is also decreased.

A method of decreasing Tx power on the basis of the cell loading may be applied not only to an RRM RS but also to a synchronization signal, for example, a primary synch signal (PSS)/secondary synch signal (SSS) and a discovery signal (DS), and a channel (e.g., PBCH, SIB1, RAR) utilized in a process in which the UE has access to a cell. Hereinafter, detailed examples thereof will be described.

In a first example, cell loading information (e.g., a resource usage rate) measured during a specific measurement duration is divided into several levels, and a Tx power reduction amount of an RRM RS is determined for each level. For example, if the average number of RBs for each subframe is greater than or equal to a half during the specific measurement duration, it may be considered to decrease Tx power of the RRM RS by half. The Tx power reduction amount may be determined for each cell loading level through a higher layer signal, and may be determined according to a power reduction parameter set received through the higher layer signal.

In a second example, cell loading information (e.g., a resource usage rate) measured during a specific measurement duration is divided into several levels, and a Tx power reduction amount of an RRM RS is determined for each level. For example, if the average number of RBs for each subframe is greater than or equal to a half during the specific measurement duration, it may be considered to decrease Tx power of the RRM RS by half. However, if the RS is utilized in demodulation of a specific channel and the specific channel is cell-specific, decreasing of power for the RS may not be performed. For example, the RS may be a CRS, and Tx power of the CRS may not be decreased in subframes #0 and #5 in which a PBCH or an SIB1 is transmitted. That is, to protect important information such as MIB, SIB1, or the like, the Tx power of the CRS may not be decreased in the subframes.

In a third example, cell loading information (e.g., a resource usage rate) measured during a specific measurement duration is divided into several levels, and a Tx power reduction amount of PSS and/or SSS is determined for each level. In this case, if the UE 100 has already camped on a corresponding cell, since the UE 100 is aware of an ID of the cell, the PSS/SSS can be detected at relatively low power. On the other hand, a UE which will newly camp on a cell for transmitting the PSS/SSS at Tx power regulated to be low has a low possibility of detecting the cell. Accordingly, a load balancing effect can be achieved between a plurality of intra-frequency cells.

Figure 14B:
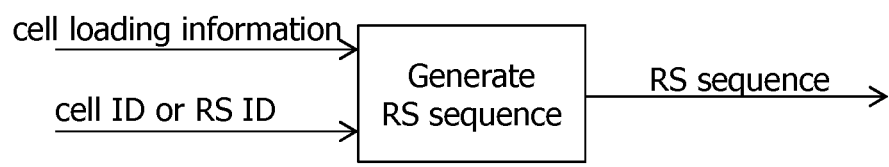
FIG. 14b shows an example of methods in which a reference signal is generated differently depending on cell loading information according to a second method of a second disclosure of the present specification.
Figure 14B:
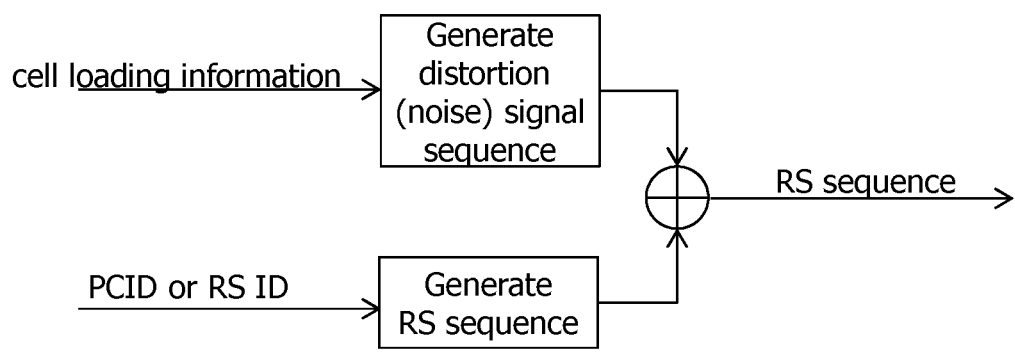

FIG. 14b shows an example of methods in which a reference signal is generated differently depending on cell loading information according to a second method of a second disclosure of the present specification.

As can be seen from FIG. 14b, a cell of a BS may consider cell loading information when generating a sequence of a reference signal (RS). The cell may be a small cell, or may be a cell determined through a higher layer signal.

Specifically, as can be seen from FIG. 14b (a), the cell of the BS may generate an RS sequence on the basis of a physical cell ID or an RS ID and cell loading information. In this case, the cell loading information may be additionally input to a pseudo-random sequence of Equation 1.

Alternatively, as can be seen from FIG. 14b (b), the cell of the BS may generate an RS sequence on the basis of a physical cell ID or an RS ID, and may generate a distortion (noise) signal sequence on the basis of cell loading information and thereafter may add the two sequences. In the added signal, the distortion (noise) signal sequence may be increased in proportion to an increase in a traffic amount of a corresponding cell. As such, an RS in which many distortion (noise) signals are mixed cannot be correctly detected by the UE 100. However, the distortion (noise) sequence may be delivered to UEs which have already camped on the corresponding cell through a cell-specific higher layer signal. Therefore, the UE which has previously camped on the cell may cancel the distortion (noise) signal, and may receive the RS. Accordingly, a load balancing effect can be achieved between a plurality of intra-frequency cells.

In order for the UE 100 to more effectively perform interference cancellation (IC) for the distortion (noise) signal, the corresponding cell may deliver information on a sequence of the distortion (noise) signal to the UE 100. Hereinafter, a method of transmitting an RS mixed with a distortion (noise) signal on the basis of cell loading information will be described in detail.

In a first example, the cell may deliver information on a sequence of the distortion (noise) signal to a UE camping on the cell through a cell-specific higher layer signal. The information to be delivered may include a seed value that can be utilized when generating the sequence. Subsequently, the cell adds the distortion (noise) signal to modulated symbols corresponding to an RS. Tx power of the distortion (noise) signal may be determined on the basis of cell loading information (e.g., a resource usage rate). For example, it is configured that Tx power of the distortion (noise) signal is increased in proportion to an increase in the average number of RBs in use for each subframe during a measurement duration in the cell. When the average number of RBs in use is decreased below a specific level, Tx power of the distortion (noise) signal is set to 0. Accordingly, the UE camping on the cell may cancel the distortion (noise) signal by using the received information, and thereafter may estimate RSRP of only the RS. On the other hand, in case of a new UE, a possibility of detecting the RS is decreased due to the distortion (noise) signal.

In a second example, the cell reports information on a sequence of the distortion (noise) signal to a UE camping on the cell through a cell-specific higher layer signal. The information to be delivered may include a seed value that can be utilized when generating the sequence. The sequence of the distortion (noise) signal plays a role of an additional scrambling sequence for a sequence of the RS, and whether to perform the scrambling is determined according to cell loading (or a traffic amount). For example, if a resource usage rate of the cell exceeds a threshold predetermined or determined through a higher layer signal, scrambling is performed by utilizing the sequence of the distortion (noise) signal to avoid an introduction of the new UE. The UE which has already camped on the cell may detect an RS through blind detection regarding whether to perform the scrambling. The additional scrambling may be changing of a sequence or seed value of the RS.

In a third example, the cell reports information on the distortion (noise) signal to a UE camping on the cell through a cell-specific higher layer signal. The information to be delivered may include a seed value that can be utilized when generating a sequence of the distortion (noise) signal. Subsequently, the cell adds the sequence of the distortion (noise) signal to PSS and/or SSS. Tx power of the distortion (noise) signal may be determined on the basis of cell loading information (e.g., a resource usage rate). For example, Tx power of the distortion (noise) signal is increased in proportion to an increase in the average number of RBs in use for each subframe during a measurement duration in the cell. When the average number of RBs in use is decreased to below a specific level, Tx power of the distortion (noise) signal may be determined to 0. Accordingly, the UE which has already camped on the cell may perform time/frequency tracking by using the delivered information and the known PSS and/or SSS, and other UEs may perform suitable synchronization through the PSS/SSS added with the distortion (noise) signal.

In a forth example, the cell may deliver a sequence of the distortion (noise) signal to a UE camping on the cell through a cell-specific higher layer signal. The information to be delivered may include a seed value that can be utilized when generating the sequence of the distortion (noise) signal. The sequence of the distortion (noise) signal may play a role of an additional scrambling sequence for PSS and/or SSS, and whether to perform the scrambling may be determined according to cell loading (or a traffic amount). In case of the PSS, one of three PSS candidates may be selectively changed. In case of the SSS, it may be also implemented such that all or some of parameters for determining the SSS are changed. The cell loading-based changing method may consider a procedure of automatic changing based on actually measured cell loading, and the changing of each sequence or parameter may be independently performed by using cell loading information measured by a BS.

Figure 15:
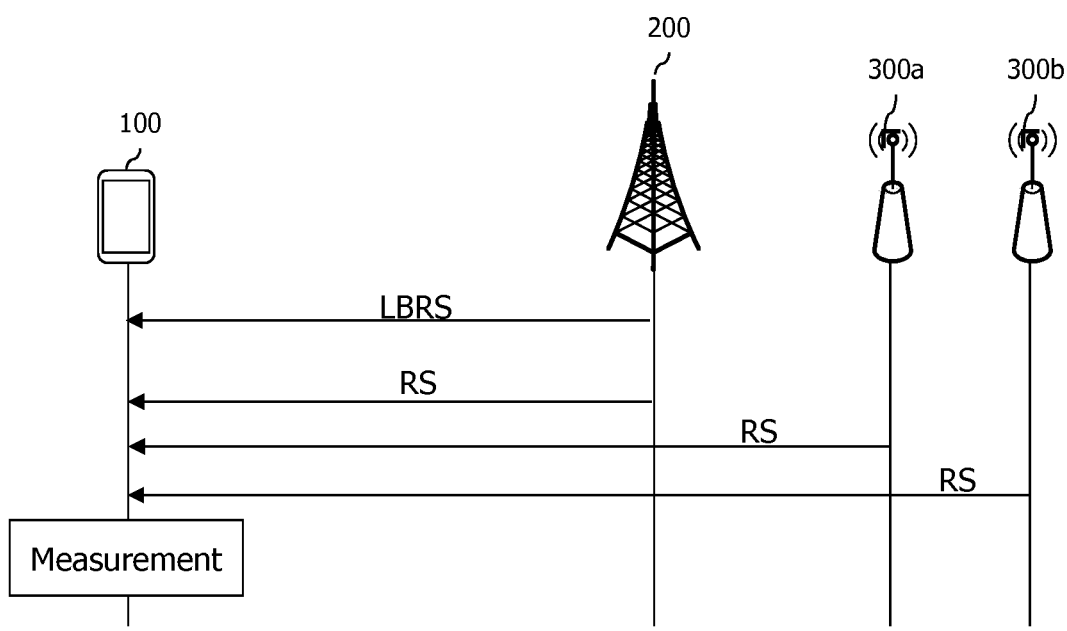
FIG. 15 shows a method according to a third disclosure of the present specification.

FIG. 15 shows a method according to a third disclosure of the present specification.

Referring to FIG. 15, a serving cell of a UE 100 is a macro cell 200, and several small cells 300a and 300b exist in the macro cell.

In such a situation, the UE 100 may perform dual-connectivity on the macro cell and at least one small cell, or may add the at least one small cell as a secondary cell. In this case, the serving cell 200 may report to the UE 100 about an RRM measurement reference for cell selection of the at least one small cell. According to the measurement reference, an RRM measurement result (e.g., RSRP, RSRQ, RSSI) may include or may not include cell loading information. In this case, a reference signal (RS) for the measurement reference may be separately designed, and is hereinafter referred to as a load balancing reference signal (LBRS). Transmission of the LBRS may vary depending on a physical cell ID and the cell loading information. For example, a Tx subframe, a Tx RB, and Tx power, or the like may vary. More specifically, a plurality of PRB sets may be created for a plurality of intra-frequency cells, and each cell may transmit the LBRS only on a predetermined PRB set according to the physical cell ID. For example, a cell of which a modulo value of a physical cell ID is 0 may transmit an LBRS of the cell on a PRB set corresponding to a first PRB set among pre-partitioned PRB sets. In addition, the cell may determine Tx power of the LBRS according to cell loading information. The cell loading may be the number of RBs currently in use in the cell or an average value of the number of RBs in use for each subframe during a measurement duration, or may be a prediction value estimated by using interpolation, extrapolation, or the like. If the cell loading (hereinafter, a traffic amount) is less than a value predetermined or determined through a higher layer signal, the Tx power of the LBRS may be determined as non-zero power, or the cell may be allowed to determine this as non-zero power independently by using a cell loading value. On the contrary, if the cell loading is greater than the value predetermined or determined through the higher layer signal, the Tx power of the LBRS may be set to zero power, or the cell may set this to zero power independently. In the above case, since the UE may a perform measurement on REs corresponding to the LBRS, the cell loading information may be utilized either directly or indirectly.

The aforementioned embodiments of the present invention can be implemented through various means. For example, the embodiments of the present invention can be implemented in hardware, firmware, software, combination of them, etc. Details thereof will be described with reference to the drawing.

Figure 16:
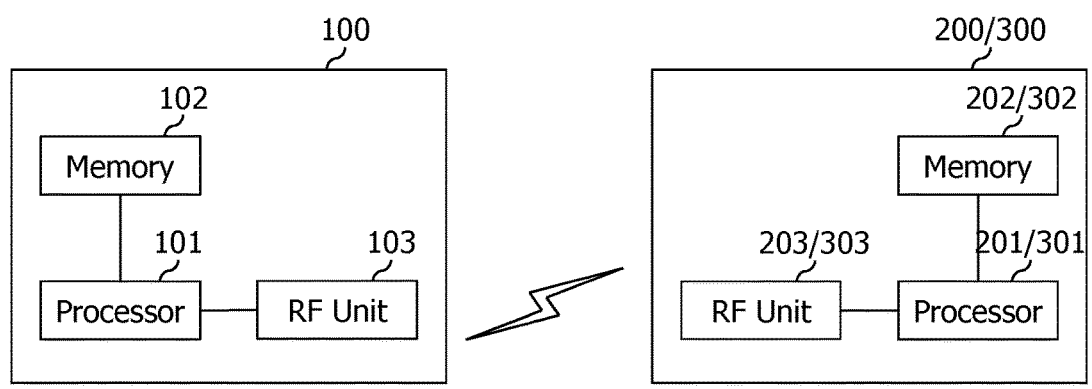
FIG. 16 is a block diagram illustrating a wireless communication system according to an embodiment of the present invention.

FIG. 16 is a block diagram illustrating a wireless communication system according to an embodiment of the present invention.

The base station (BS) 200/300 includes processor 201/301, memory 202/302, and radio frequency (RF) unit 203/303. The memory 202/302 coupled with the processor 201/301 stores a variety of information for driving the processor 201/301. The RF unit 203/303 coupled to the processor 201/301 transmits and/or receive radio signals. The processor 201/301 implements the proposed functions, procedures, and/or methods. In the aforementioned embodiment, an operation of the BS may be implemented by the processor 201/301.

The MTC device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of transmitting a reference signal in a small cell, the method comprising:
   generating, by the small cell, a first sequence of the reference signal using a physical cell identity (ID) of the small cell and a second sequence of the reference signal using a cell loading level of the small cell,
   wherein the second sequence is a distortion signal sequence, which increases in proportion to an increase in traffic in a corresponding cell,
   adding the first sequence and the second sequence to form a combined sequence of the reference signal;
   inputting the physical cell ID and information based on the cell loading level to a pseudo-random sequence;
   transmitting, by the small cell, the combined sequence on a mapped resource element (RE); and
   transmitting, by the small cell to a terminal camping on the small cell, information related to the cell loading level via a cell-specific signal of the small cell,
   wherein the information related to the cell loading level includes a seed value for generating the second sequence,
   wherein the distortion signal sequence is used as an additional scrambling sequence for a sequence of a reference signal, wherein, when a resource usage rate of the cell exceeds a threshold, a scrambling process is performed based on the distortion signal sequence in order to avoid an entrance of a new terminal into the small cell, and wherein the pseudo-random sequence is generated from the seed value on the physical cell ID by the following equation:

$$a_{k,l}^{(p)} = r_{l,n_s}(m')$$

where $n_s$ denotes a slot number in one radio frame, p denotes an antenna port, l denotes an OFDM symbol number in a slot, and k denotes a subcarrier index.

2. A base station of a small cell, the base station comprising:
- a transceiver; and
- a processor that:
  - generates a first sequence of a reference signal using a physical cell identity (ID) of the small cell and a second sequence of the reference signal using a cell loading level of the small cell,
  - wherein the second sequence is a distortion signal sequence, which increases in proportion to an increase in traffic in a corresponding cell,
  - adds the first sequence and the second sequence to form a combined sequence of the reference signal;
  - inputs the physical cell ID and information based on the cell loading level to a pseudo-random sequence; and
  - controls the transceiver to transmit combined sequence on a mapped resource element (RE), and to transmit, to a terminal camping on the small cell, information related to the cell loading level via a cell-specific signal of the small cell, wherein the information related to the cell loading level includes a seed value for generating the second sequence, wherein the distortion signal sequence is used as an additional scrambling sequence for a sequence of a reference signal, wherein, when a resource usage rate of the cell exceeds a threshold, a scrambling process is performed based on the distortion signal sequence in order to avoid an entrance of a new terminal into the small cell, and wherein the pseudo-random sequence is generated from the seed value on the physical cell ID by the following equation:

$$a_{k,l}^{(p)} = r_{l,n_s}(m')$$

where $n_s$ denotes a slot number in one radio frame, p denotes an antenna port, l denotes an OFDM symbol number in a slot, and k denotes a subcarrier index.

\* \* \* \* \*